United States Patent
Dreasher et al.

(10) Patent No.: US 9,896,114 B2
(45) Date of Patent: Feb. 20, 2018

(54) METHOD AND PROTECTION SYSTEM FOR TRAINS OPERATING AT RESTRICTED SPEED

(71) Applicant: Westinghouse Air Brake Technologies Corporation, Wilmerding, PA (US)

(72) Inventors: Rebecca W Dreasher, Longmont, CO (US); Jeffrey D Kernwein, Cedar Rapids, IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 14/955,844

(22) Filed: Dec. 1, 2015

(65) Prior Publication Data
US 2016/0152254 A1  Jun. 2, 2016

Related U.S. Application Data

(60) Provisional application No. 62/085,871, filed on Dec. 1, 2014.

(51) Int. Cl.
*B61L 25/02* (2006.01)
*H04W 4/04* (2009.01)
*B61L 15/00* (2006.01)

(52) U.S. Cl.
CPC ........... *B61L 25/02* (2013.01); *B61L 15/0027* (2013.01); *H04W 4/046* (2013.01)

(58) Field of Classification Search
CPC .. B61L 25/02; B61L 15/0027; B61L 15/0036; B61L 15/0081; B61L 25/025; B61L 2205/04; B61L 15/0072; H04W 4/046; B61C 17/12; H04L 61/2046; H04L 61/2038; H04L 61/103
See application file for complete search history.

(56) References Cited

U.S. PATENT DOCUMENTS

| | | | |
|---|---|---|---|
| 6,179,252 B1 * | 1/2001 | Roop | B61L 29/18 246/122 R |
| 7,539,624 B2 | 5/2009 | Matheson et al. | |
| 7,792,089 B2 | 9/2010 | Aiken, II et al. | |
| 2011/0118913 A1 | 5/2011 | Pretorius et al. | |

(Continued)

*Primary Examiner* — Yuen H Wong
(74) *Attorney, Agent, or Firm* — The Webb Law Firm

(57) ABSTRACT

A computer-implemented method for a plurality of trains, at least one of which is operating at a restricted speed, the method including: (a) transmitting, by at least one on-board computer of at least one train to at least one remote server, train location data; (b) requesting, by the at least one on-board computer from the at least one remote server, office polling data; (c) generating at least one poll registration message based at least partially on the office polling data; (d) based at least partially on the office polling data and/or the poll registration message, determining proximity of the at least one train to at least one subdivision; and (e) based at least partially on at least one of the following: train location data, office polling data, the poll registration message, or any combination thereof, transmitting, by the at least one remote server to at least one on-board computer of at least one train, train location data comprising location or position data related to at least one other train. A protection system for a plurality of trains, at least one of which is operating at a restricted speed, is also disclosed.

18 Claims, 6 Drawing Sheets

(56) References Cited

U.S. PATENT DOCUMENTS

2011/0172856 A1* 7/2011 Kull ................... B61L 15/0027
                                                701/19
2014/0172205 A1* 6/2014 Ruhland ............ B61L 27/0088
                                                701/19

* cited by examiner

| Locomotive | Head-end Subdivision Location | Subdivisions for Fast Polling | Locomotive 4 Subscribed Subdivisions (ABC) ↓ ↓ ↓ | | | Sub D |
|---|---|---|---|---|---|---|
| | | | Sub A | Sub B | Sub C | |
| Locomotive 1 | D | D | | | | Loco 1 |
| Locomotive 2 | C | CD | | | Loco 2 | Loco 2 |
| Locomotive 3 | C | BCD | | Loco 3 | Loco 3 | Loco 3 |
| Locomotive 4 | B | ABC | Loco 4 | Loco 4 | Loco 4 | |
| Locomotive 5 | B | AB | Loco 5 | Loco 5 | | |
| Locomotive 6 | B | B | | Loco 6 | | |

"Candidate Locomotive" Example Table

FIG. 5

METHOD AND PROTECTION SYSTEM FOR TRAINS OPERATING AT RESTRICTED SPEED

CROSS REFERENCE TO RELATED APPLICATIONS

This application claims the benefit of priority to U.S. provisional application 62/085,871, filed on Dec. 1, 2014, the entire contents of which are hereby incorporated by reference.

BACKGROUND OF THE INVENTION

Field of the Invention

Disclosed embodiments relate generally to vehicle systems and networks, such as, railway systems including trains travelling in a track or rail network, and in particular to a method and system for providing improved protection for trains operating at restricted speed, such as in connection with positive train control (PTC) systems.

Description of Related Art

Vehicle systems and networks exist throughout the world, and, at any point in time, a multitude of vehicles, such as, cars, trucks, buses, trains, and the like, are travelling throughout the system and network. With reference to trains travelling in a track network, the locomotives of such trains are typically equipped with or operated using train control, communication, and management systems, (e.g., positive train control (PTC) systems), such as, the I-ETMS® of Wabtec Corp.

The Code of Federal Regulations (CFR), Section 49, Part 236, Subpart G-Definitions §236.812, defines restricted speed as "A speed that will permit stopping within one-half the range of vision, but not exceeding 20 miles per hour." In conventional train management systems, certain train control functions are programmed or configured to limit a train to the objective speed limit, such as a speed limit of 20 mph. However, such existing systems cannot provide protection with respect to other vehicles and/or unmonitored rail obstructions or conditions. In particular, existing PTC systems can enforce the objective portion of this definition, (i.e., 20 mph), but are unable to enforce the subjective (and true intent) of the regulation.

For at least these reasons, there is a need in the art for an improved train control system and method.

SUMMARY OF THE INVENTION

Generally, provided are an improved computer-implemented method and system for use in protection and management of trains operating at restricted speed. Preferably, provided is improved protection where trains are operating at restricted speed.

In one preferred and non-limiting embodiment or aspect, a method and system are implemented in connection with a Positive Train Control (PTC) system, wherein the on-board segment of the PTC system generates targets and enforces for the locations of other trains operating under PTC control. In one preferred and non-limiting embodiment or aspect, a method and system use a combination of existing and new PTC messages. Existing messages may include locomotive position reports and office poll registration messages sent by a PTC On-Board System to a PTC Back Office Server. New messages may include locomotive position reports sent by a Train Location Server to the PTC On-Board System.

In one preferred and non-limiting embodiment or aspect, the Train Location Server receives all locomotive position reports addressed to the PTC Back Office Server, and forwards a sub-set of locomotive position reports to trains reporting that they are operating at restricted speed. The PTC On-Board System receives locomotive position reports sent by the Train Location Server, and generates targets based on these locations if they are in the train's calculated route.

In another preferred and non-limiting embodiment or aspect, a computer-implemented method and system facilitates or provides the ability of PTC-equipped trains operating at restricted speed to enforce based on specified types of obstacle which may be present, e.g., other PTC-equipped trains. In this embodiment or aspect, a Train Location Server located in the railroad office collects location reports from all reporting PTC trains and forwards a subset of these location reports to trains operating at restricted speed. The PTC On-Board System operating at restricted speed generates targets based on the location of these nearby trains.

According to one preferred and non-limiting embodiment or aspect, provided is a computer-implemented method for use in connection with trains operating at restricted speed as described herein.

According to another preferred and non-limiting embodiment or aspect, provided is a protection system for use in connection with trains operating at restricted speed as described herein.

In one preferred and non-limiting embodiment or aspect, a computer-implemented method for a plurality of trains, at least one of which is operating at a restricted speed, comprises (a) transmitting, by at least one on-board computer of at least one train to at least one remote server, train location data; (b) requesting, by the at least one on-board computer from the at least one remote server, office polling data; (c) generating at least one poll registration message based at least partially on the office polling data; (d) based at least partially on the office polling data and/or the poll registration message, determining proximity of the at least one train to at least one subdivision; and (e) based at least partially on at least one of the following: train location data, office polling data, the poll registration message, or any combination thereof, transmitting, by the at least one remote server to at least one on-board computer of at least one train, train location data comprising location or position data related to at least one other train.

In one preferred and non-limiting embodiment or aspect, the transmitting step (a) is implemented on at least one of the following bases: at least one interval, at least one regular interval, at least one condition, at least one trigger, at least one trigger event, a change in direction of travel, a location in relation to at least one feature, at least one state, initiation of restricted speed, cessation of restricted speed, or any combination thereof.

In one preferred and non-limiting embodiment or aspect, the train location data comprises at least one of the following: head-end track location, rear-end track location, head-end data, rear-end data, speed, Earth-centered Earth-fixed location data, Earth-centered Earth-fixed location of the head-end of the train, track data, target data, direction data, position uncertainty, processor slice voting results, or any combination thereof.

In one preferred and non-limiting embodiment or aspect, the office polling data comprises at least one of the following: synchronization data, mandatory directive data, subdivision data, or any combination thereof.

In one preferred and non-limiting embodiment or aspect, the requesting step (b) is based at least partially on at least one of the following: train location, train location with respect to at least one subdivision, or any combination thereof.

In one preferred and non-limiting embodiment or aspect, the method further comprises authenticating, by at least one remote server, at least a portion of the train location data and at least a portion of the poll registration message.

In one preferred and non-limiting embodiment or aspect, the method further comprises storing, by the at least one remote server, at least a portion of the train location data based at least partially upon timing or status.

In one preferred and non-limiting embodiment or aspect, the at least one train in transmitting step (e) comprises transmission to at least one train that is operating at restricted speed.

In one preferred and non-limiting embodiment or aspect, the transmitting step (e) further comprises filtering the train location data.

In one preferred and non-limiting embodiment or aspect, the filtering comprises determining at least one "nearby" locomotive of at least one train.

In one preferred and non-limiting embodiment or aspect, the determining of at least one "nearby" locomotive comprises: (i) based at least partially on the train location data, identifying at least one locomotive of at least one train as at least one "subscribing" locomotive; (ii) based at least partially on train location data and/or office polling data, identifying at least one "subscribed" subdivision for the at least one "subscribing" locomotive; (iii) based at least partially on at least one of steps (i) and (ii), identifying at least one locomotive as at least one "candidate" locomotive; and (iv) based at least partially on at least one of steps (i)-(iii), identifying at least one locomotive as at least one "nearby" locomotive.

In one preferred and non-limiting embodiment or aspect, identifying step (iv) comprises analyzing train data of the at least one "subscribing" locomotive and the at least one "candidate" locomotive.

In one preferred and non-limiting embodiment or aspect, the train data comprises at least one of the following: head-end data, Earth-centered Earth-fixed data, train location data, train position data, or any combination thereof.

In one preferred and non-limiting embodiment or aspect, the method further comprises transmitting, by the at least one remote server to the at least one "subscribing" locomotive, the identification of at least one "nearby" locomotive.

In one preferred and non-limiting embodiment or aspect, the requesting step (b) is repeated periodically.

In one preferred and non-limiting embodiment or aspect, the period is determined at least partially based upon at least one of the following: the office polling data, the train location data, subdivision data, or any combination thereof.

In one preferred and non-limiting embodiment or aspect, the train location data of transmitting step (e) comprises at least one of the following: train data, head-end data, rear-end data, track data, speed data, target data, direction data, or any combination thereof.

In one preferred and non-limiting embodiment or aspect, the method further comprises (f) storing, processing, or deleting, by the at least one on-board computer of the at least one train, at least a portion of the train location data.

In one preferred and non-limiting embodiment or aspect, the on-board computer of at least one train implements at least one warning or enforcement action with respect to the at least one train.

In one preferred and non-limiting embodiment or aspect, a protection system for a plurality of trains, at least one of which is operating at a restricted speed, comprises one or more processing or communication components programmed or configured to implement a method comprising: (a) transmitting, by at least one on-board computer of at least one train to at least one remote server, train location data; (b) requesting, by the at least one on-board computer from the at least one remote server, office polling data; (c) generating at least one poll registration message based at least partially on the office polling data; (d) based at least partially on the office polling data and/or the poll registration message, determining proximity of the at least one train to at least one subdivision; and (e) based at least partially on at least one of the following: train location data, office polling data, the poll registration message, or any combination thereof, transmitting, by the at least one remote server to at least one on-board computer of at least one train, train location data comprising location or position data related to at least one other train.

In one preferred and non-limiting embodiment or aspect, a protection system for a train having at least one locomotive or control car and, optionally, at least one railroad car, operating in a track network, comprises on the at least one locomotive or control car: an on-board computer programmed or configured to implement or facilitate at least one train action; a communication device in communication with the on-board computer and programmed or configured to receive, transmit, and/or process data signals, wherein the on-board computer of the at least one locomotive or control car is programmed or configured to: transmit, via the communication device, train location data to at least one remote server; request, from the at least one remote server, office polling data; receive, via the communication device, the requested office polling data; generate at least one poll registration message based at least partially on the office polling data; and based at least partially on the office polling data and/or the poll registration message, determine proximity of the at least one train to at least one subdivision; and wherein the at least one remote server is programmed or configured to transmit, based at least partially on at least one of the following: train location data, office polling data, the poll registration message, or any combination thereof, to the at least one on-board computer of at least one train, train location data comprising location or position data related to at least one other train.

In one preferred and non-limiting embodiment or aspect, a protection system for a plurality of trains, each train having at least one locomotive or control car and, optionally, at least one railroad car, operating in a track network, comprises at least one remote server, wherein the at least one remote server is programmed or configured to: receive train location data from the plurality of trains; receive poll registration messages from the plurality of trains; transmit, based at least partially on at least one of the following: the train location data, office polling data, the poll registration messages, or any combination thereof, to at least one train, train location data comprising location or position data related to at least one other train.

Further embodiments or aspects will now be described and set forth in the following numbered clauses:

Clause 1: A computer-implemented method for a plurality of trains, at least one of which is operating at a restricted speed, the method comprising: (a) transmitting, by at least one on-board computer of at least one train to at least one remote server, train location data; (b) requesting, by the at least one on-board computer from the at least one remote server, office polling data; (c) generating at least one poll registration message based at least partially on the office polling data; (d) based at least partially on the office polling data and/or the poll registration message, determining proximity of the at least one train to at least one subdivision; and (e) based at least partially on at least one of the following: train location data, office polling data, the poll registration message, or any combination thereof, transmitting, by the at least one remote server to at least one on-board computer of at least one train, train location data comprising location or position data related to at least one other train.

Clause 2: The computer-implemented method of clause 1, wherein the transmitting step (a) is implemented on at least one of the following bases: at least one interval, at least one regular interval, at least one condition, at least one trigger, at least one trigger event, a change in direction of travel, a location in relation to at least one feature, at least one state, initiation of restricted speed, cessation of restricted speed, or any combination thereof.

Clause 3: The computer-implemented method of clause 1 or 2, wherein the train location data comprises at least one of the following: head-end track location, rear-end track location, head-end data, rear-end data, speed, Earth-centered Earth-fixed location data, Earth-centered Earth-fixed location of the head-end of the train, track data, target data, direction data, position uncertainty, processor slice voting results, or any combination thereof.

Clause 4: The computer-implemented method of any of clauses 1-3, wherein the office polling data comprises at least one of the following: synchronization data, mandatory directive data, subdivision data, or any combination thereof.

Clause 5: The computer-implemented method of any of clauses 1-4, wherein the requesting step (b) is based at least partially on at least one of the following: train location, train location with respect to at least one subdivision, or any combination thereof.

Clause 6: The computer-implemented method of any of clauses 1-5, further comprising authenticating, by at least one remote server, at least a portion of the train location data and at least a portion of the poll registration message.

Clause 7: The computer-implemented method of any of clauses 1-6, further comprising storing, by the at least one remote server, at least a portion of the train location data based at least partially upon timing or status.

Clause 8: The computer-implemented method of any of clauses 1-7, wherein the at least one train in transmitting step (e) comprises transmission to at least one train that is operating at restricted speed.

Clause 9: The computer-implemented method of any of clauses 1-8, wherein transmitting step (e) further comprises filtering the train location data.

Clause 10: The computer-implemented method of any of clauses 1-9, wherein the filtering comprises determining at least one "nearby" locomotive of at least one train.

Clause 11: The computer-implemented method of any of clauses 1-10, wherein the determining of at least one "nearby" locomotive comprises: (i) based at least partially on the train location data, identifying at least one locomotive of at least one train as at least one "subscribing" locomotive; (ii) based at least partially on train location data and/or office polling data, identifying at least one "subscribed" subdivision for the at least one "subscribing" locomotive; (iii) based at least partially on at least one of steps (i) and (ii), identifying at least one locomotive as at least one "candidate" locomotive; and (iv) based at least partially on at least one of steps (i)-(iii), identifying at least one locomotive as at least one "nearby" locomotive.

Clause 12: The computer-implemented method of any of clauses 1-11, wherein identifying step (iv) comprises analyzing train data of the at least one "subscribing" locomotive and the at least one "candidate" locomotive.

Clause 13: The computer-implemented method of any of clauses 1-12, wherein the train data comprises at least one of the following: head-end data, Earth-centered Earth-fixed data, train location data, train position data, or any combination thereof.

Clause 14: The computer-implemented method of any of clauses 1-13, further comprising transmitting, by the at least one remote server to the at least one "subscribing" locomotive, the identification of at least one "nearby" locomotive.

Clause 15: The computer-implemented method of any of clauses 1-14, wherein the requesting step (b) is repeated periodically.

Clause 16: The computer-implemented method of any of clauses 1-15, wherein the period is determined at least partially based upon at least one of the following: the office polling data, the train location data, subdivision data, or any combination thereof.

Clause 17: The computer-implemented method of any of clauses 1-16, wherein the train location data of transmitting step (e) comprises at least one of the following: train data, head-end data, rear-end data, track data, speed data, target data, direction data, or any combination thereof.

Clause 18: The computer-implemented method of any of clauses 1-17, further comprising (f) storing, processing, or deleting, by the at least one on-board computer of the at least one train, at least a portion of the train location data.

Clause 19: The computer-implemented method of any of clauses 1-18, wherein the on-board computer of at least one train implements at least one warning or enforcement action with respect to the at least one train.

Clause 20: A protection system for a plurality of trains, at least one of which is operating at a restricted speed, wherein the system comprises one or more processing or communication components programmed or configured to implement one or more steps of any of clauses 1-19.

Clause 21: A protection system for a train having at least one locomotive or control car and, optionally, at least one railroad car, operating in a track network, the system comprising: on the at least one locomotive or control car: an on-board computer programmed or configured to implement or facilitate at least one train action; a communication device in communication with the on-board computer and programmed or configured to receive, transmit, and/or process data signals, wherein the on-board computer of the at least one locomotive or control car is programmed or configured to: transmit, via the communication device, train location data to at least one remote server; request, from the at least one remote server, office polling data; receive, via the communication device, the requested office polling data; generate at least one poll registration message based at least partially on the office polling data; and based at least partially on the office polling data and/or the poll registration message, determine proximity of the at least one train to at least one subdivision; and wherein the at least one remote server is programmed or configured to transmit, based at least partially on at least one of the following: train location data, office polling data, the poll registration message, or any combination thereof, to the at least one on-board computer of at least one train, train location data comprising location or position data related to at least one other train.

Clause 22: A protection system for a plurality of trains, each train having at least one locomotive or control car and, optionally, at least one railroad car, operating in a track network, the system comprising: at least one remote server, wherein the at least one remote server is programmed or configured to: receive train location data from the plurality of trains; receive poll registration messages from the plurality of trains; transmit, based at least partially on at least one of the following: the train location data, office polling data, the poll registration messages, or any combination thereof, to at least one train, train location data comprising location or position data related to at least one other train.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Further features and other objects and advantages will become apparent from the following detailed description made with reference to the drawings in which:

FIG. 5 is a table showing example train distribution over subdivisions.

DETAILED DESCRIPTION OF THE INVENTION

Figure 1A:
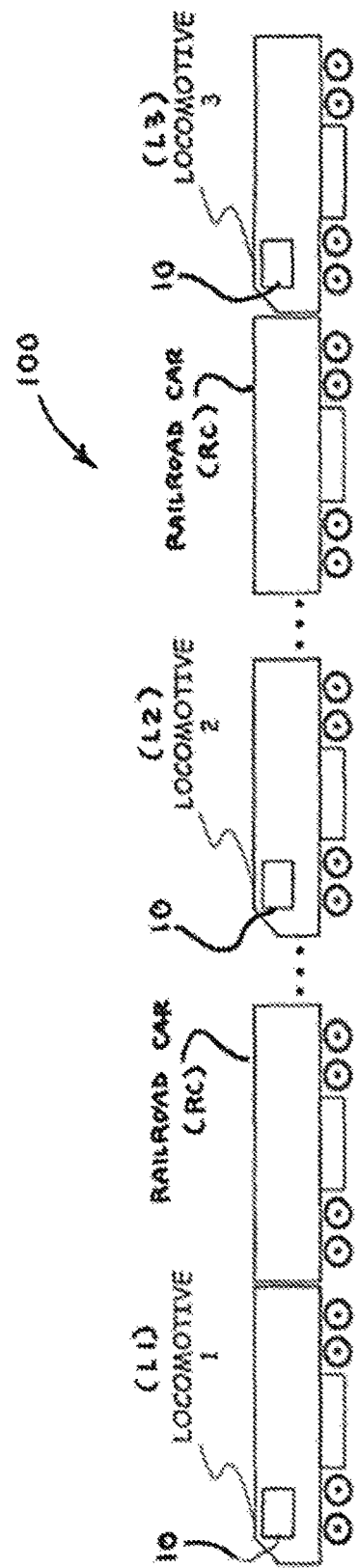
FIG. 1A is a schematic view of a train control system according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hard-wired (e.g., over the rails of a track)) between two units, such as two locomotive units or locomotive power groups. In one preferred and non-limiting embodiment or aspect, the "communication device" is a radio transceiver programmed, configured, or adapted to wirelessly transmit and receive radio frequency signals and data over a radio signal communication path.

The present invention, including the various computer-implemented and/or computer-designed aspects and configures, may be implemented on a variety of computing devices and systems, wherein these computing devices include the appropriate processing mechanisms and computer-readable media for storing and executing computer-readable instructions, such as programming instructions, code, and the like. In addition, aspects of this invention may be implemented on existing controllers, control systems, and computers integrated or associated with, or positioned on, a locomotive or control car and/or any of the railroad cars. For example, the presently-invented system or any of its functional components can be implemented wholly or partially on a train management computer, a Positive Train Control computer, an on-board controller or computer, a railroad car computer, and the like. In addition, the presently-invented systems and methods may be implemented in a laboratory environment in one or more computers or servers. Still further, the functions and computer-implemented features of the present invention may be in the form of software, firmware, hardware, programmed control systems, microprocessors, and the like.

The control system and computer-implemented control method described and claimed herein may be implemented in a variety of systems and vehicular networks; however, the systems and methods described herein are particularly useful in connection with a railway system and network. Accordingly, the presently-invented methods and systems can be implemented in various known train control and management systems, e.g., the I-ETMS® of Wabtec Corp. Referring to FIG. 1A, the systems and methods described herein are useful in connection with and/or at least partially implemented on one or more locomotives or control cars (L) that make up a train (TR). It should be noted that multiple locomotives or control cars (L1, L2, and L3) may be included in the train (TR) to facilitate the reduction of the train (TR) to match with passenger (or some other) demand or requirement. Further, the method and systems described herein can be used in connection with commuter trains, freight trains, push-pull train configurations, and/or other train arrangements and systems. Still further, the train (TR) may be separated into different configurations (e.g., other trains (TR)) and moved in either the first direction A and/or the second direction B. Any configuration or arrangement of locomotives, control cars, and/or railroad cars may be designated as a train and/or a consist. Still further, it is to be expressly understood that the presently-invented methods and systems described herein may be implemented on and/or used in connection with an auxiliary vehicle, such as an auxiliary railroad vehicle, a maintenance vehicle or machine, a road vehicle (e.g., truck, pick-up truck, car, or other machine), a vehicle equipped to ride on the rails of the track, and/or the like.

In one preferred and non-limiting embodiment or aspect, the methods and systems described herein are used in connection with the locomotives or controls cars (L) that are positioned on each end of the train (TR), while in other preferred and non-limiting embodiments, the methods and systems described herein are used in connection with locomotives or control cars (L) that are positioned intermediately in the train (TR) (since these intermediate locomotives or control cars (L) may eventually become a controlling locomotive or control car (L) when the train (TR) is reconfigured). It is also noted that the methods and systems described herein may be used in connection with "electrical multiple unit" (EMU) or "diesel multiple unit" (DMU) configurations, where a locomotive does not technically exist, but multiple control cars would still be present. Still further, the train (TR) may include only one locomotive or control car (L) and/or some or no railroad cars. Also, as discussed above, the methods and systems described herein may be used in connection with any vehicle type operating in the railway network.

Figure 1B:
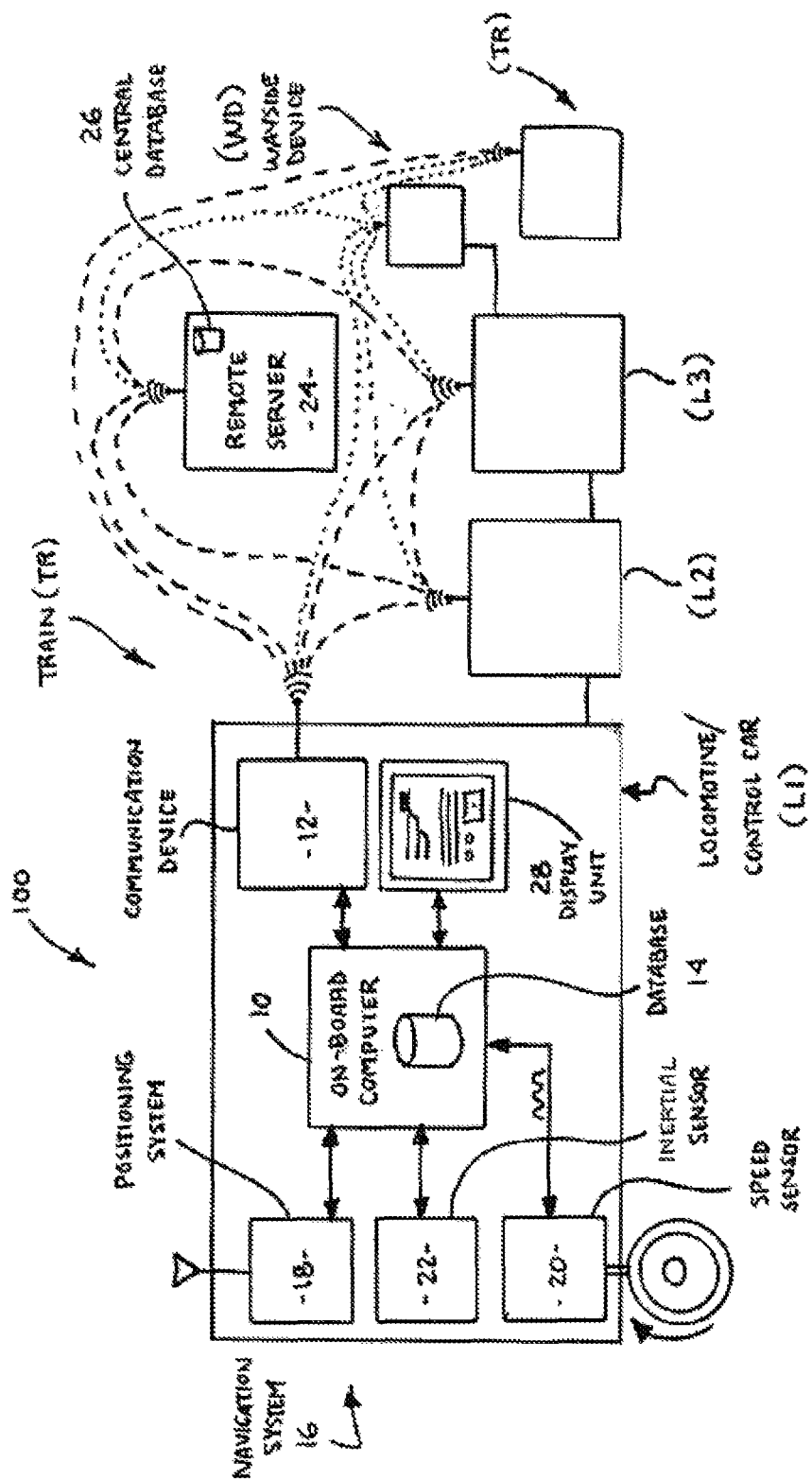
FIG. 1B is a schematic view of a train control system according to the principles of the present invention.

As illustrated in FIGS. 1A and 1B, the system architecture used to support the functionality of at least some of the methods and systems described herein includes a train management computer or on-board computer 10 (which performs calculations for or within the Positive Train Control (PTC) system, including navigation calculations), for example, a PTC On-Board System 10, a communication device or data radio 12 (which may be used to facilitate the communications between the on-board computers 10 in one or more of the locomotives or control cars (L) of a train (TR), communications with a wayside device (WD), e.g., signals, switch monitors, and the like, and/or communications with a remote server 24, e.g., a back office server, a central controller, central dispatch, and the like, a track database 14 (which may include track and/or train information and data, such as information about track positions or locations, switch locations or information, signal information, track heading changes, e.g., curves, distance measurements, train information, e.g., the number of locomotives, the number of cars, the number of conventional passenger cars, the number of control cars, the total length of the train, the specific identification numbers of each locomotive or control car (L) where PTC equipment (e.g., an on-board computer 10) is located, and the like), and a navigation system 16 (optionally including a positioning system 18 (e.g., a Global Positioning System (GPS)), a wheel tachometer/speed sensor 20, and/or at least one inertial sensor 22 (e.g., a rotational sensor, an accelerometer, a gyroscope, and the like) that is configured to measure the rate of heading change for the locomotive or control car (L), such as a PTC-equipped locomotive or control car (L)). Further, a display unit 28 may be provided in the locomotive or control car (L) to visually display information and data to the operator, as well as display information and data input by the user. Further, at least a portion of the information, e.g., received location data and/or railway data, may be populated in or stored in at least one central database 26, such as a remote database accessible by or through the remote server 24. Accordingly, the location data and/or railway data is accessible throughout and useful within the track network by any connected or communicative locomotive or control car of any travelling train (or other vehicle) for navigational or other purposes.

Accordingly, and in one preferred and non-limiting embodiment or aspect, provided is a control system 100 for a train (TR) having at least one locomotive (L), such as a first locomotive or control car (L1). Optionally, the train (TR) may include one or more second locomotives or control cars ((L2), (L3)) and/or one or more railroad cars (RC), as illustrated in FIG. 1A. In one embodiment or aspect, the train (TR) is traversing a track section (TS), which may include a target, such as a switch or a signal or other designated position in the track network. An on-board computer 10 is positioned on or integrated with one or more of the locomotives or control cars ((L1), (L2), and/or (L3)), and the on-board computer 10 is programmed or configured to implement or facilitate at least one train action. Further, the one or more locomotives or control cars ((L1), (L2), and/or (L3)) are equipped with the communication device that is in direct or indirect communication with the on-board computer 10 and programmed or configured to receive, transmit, and/or process data signals. At least one database (e.g., the track database) is accessible by the on-board computer 10 and populated with railway data, such as train data and/or track data or information.

Figure 2:
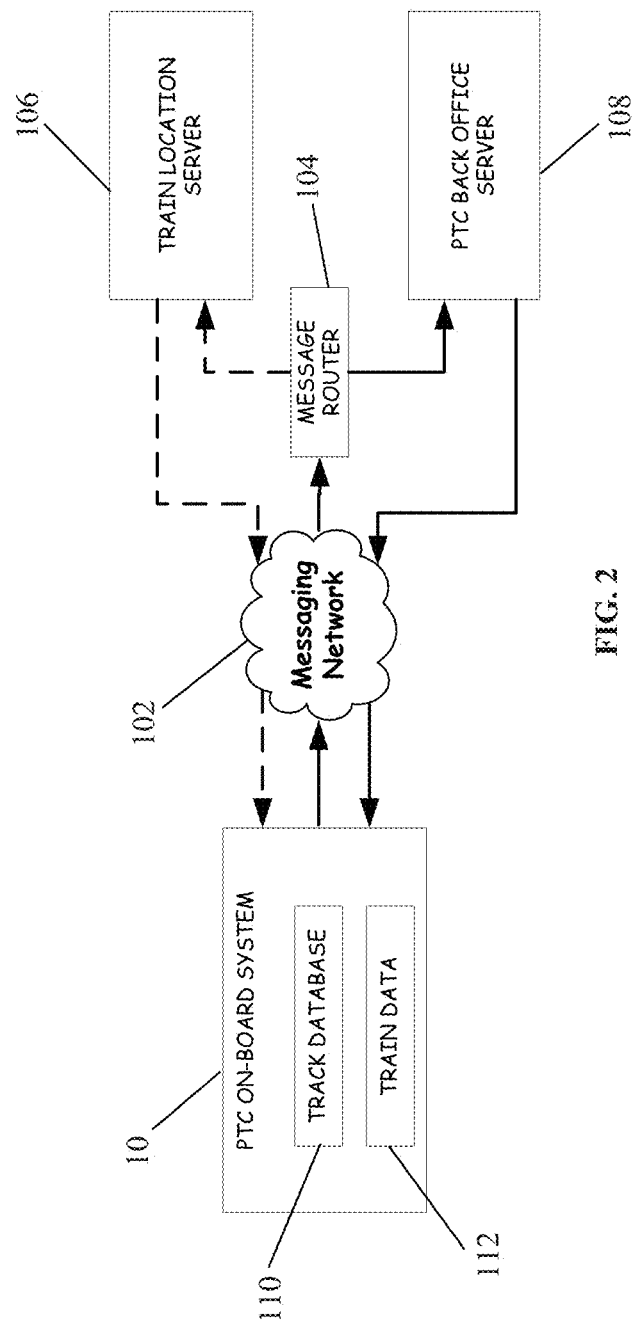
FIG. 2 is a schematic view of a protection system for trains operating at restricted speed according to principles of the present invention.

In one preferred and non-limiting embodiment or aspect, and as illustrated in FIG. 2, the computer-implemented method and system includes the following system components (where the solid lines indicate message flows already present for existing PTC operations, and the dashed lines indicate message flows used in connection with preferred and non-limiting embodiments or aspects): a PTC On-Board System 10, a Messaging Network 102, a Message Router 104, a Train Location server 106, and/or a PTC Back Office Server 108.

Each train in the PTC system may include a PTC On-Board System 10. The PTC On-Board System 10 may perform all on-board calculations for PTC for the train, and in preferred and non-limiting embodiments or aspects, the PTC On-Board system 10 reports its location, e.g., the location of a train, a locomotive, and/or a railroad car associated with the PTC On-Board system, and creates targets for other PTC trains on its route when operating at restricted speed. In one preferred and non-limiting embodiment or aspect, the PTC On-Board System 10 may include and/or use the following subsystem components: a Track Database 110 and/or a Train Consist Information Database 112. The Track Database 110 includes information about switch locations in the railway system and network and distance measurements, e.g., distance measurements between track positions or locations, and based on this information, the PTC On-Board System 10 determines when other train locations coincide with its route. The Train Consist Information Database 112 includes train consist information including the total length of the train and/or a number of cars in the consist, and based on this information, the PTC On-Board System 10 estimates a location of the train, such as a location of the rear-end of the train.

The Messaging Network 102 transports messages between PTC On-Board Systems 10 present in the field and the PTC Back Office Server 108 in fixed railroad office locations. For example, the messages can include locomotive position reports and poll registration messages transmitted from the PTC On-Board Systems 10 of the trains in the track network to the PTC Back Office Server 108.

The Message Router 104 delivers messages addressed to the PTC Back Office Server 108 to each of the PTC Back Office Server 108 and the Train Location Server 106. The Message Router 104 may include a software function or application executing on the PTC Back Office Server 108, or the Message Router 104 may include separate hardware and/or software components configured to receive the messages addressed to the PTC Back Office Server 108 and forward the messages to each of the PTC Back Office Server 108 and the Train Location Server 106.

The Train Location Server 106 records a latest or current locomotive position of each PTC On-Board System 10 in the track network and locations at which trains in the track network have requested polling based on the messages forwarded by the Message Router 104. The Train Location Server 106 forwards the train location information including the current locomotive positions and the polling positions of each of the trains (TR) in the track network to each train (TR) in the track network that reports that it is operating at restricted speed. For example, the train location information can include the location or position of the train (TR) in the track network, the location or position of at least one locomotive or control car (L) in the track network, the location or position of the at least one railroad car (RC) in the track network, the location or position of a target, e.g., a switch location or a track heading change, such as a curve, in the track network, and the location or position of the target with respect to the location or position of the train (TR) in the track network or the location or position of the at least one locomotive or control car (L) in the track network, or any combination thereof. In some preferred and non-limiting embodiments or aspects, the train location information can include current speeds of the trains (TR), current accelerations of the trains (TR), a number of locomotives (L) in the trains (TR), a number of railroad cars (RC) in the trains (TR), a total length of each of the trains (TR), or any combination thereof.

The PTC Back Office Server 108 may perform all back office operations needed for PTC. With respect to a preferred and non-limiting embodiment or aspect, the PTC Back Office Server 108 receives locomotive position reports and poll registration messages from the PTC On-Board Systems 10 of the train (TR) in the track network.

In one preferred and non-limiting embodiment or aspect, and with respect to PTC on-board system position reports, the PTC On-Board System 10 reports train location to the PTC Back Office Server 108 at regular intervals and/or when triggered by certain conditions. An on-board computer of the PTC On-Board System 10 transmits train location data to at least one remote server. For example, the transmitting can be implemented on at least one of the following bases: at least one interval, at least one regular interval, at least one condition, at least one trigger, at least one trigger event, a change in direction of travel, a location in relation to at least one feature, at least one state, initiation of restricted speed, cessation of restricted speed, or any combination thereof. The train location data can include at least one of the following: head-end track location, rear-end track location, head-end data, rear-end data, speed, Earth-centered Earth-fixed location data, Earth-centered Earth-fixed location of the head-end of the train, track data, target data, direction data, position uncertainty, processor slice voting results, or any combination thereof. the at least one remote server can store at least a portion of the train location data based at least partially upon timing or status.

Triggering conditions may include changes in direction of travel of the train (TR), a location of the train (TR) in relation to track features, (e.g., a distance of the train (TR) to switches, block boundaries, etc.), and other system state changes. Each location report, e.g., Locomotive Position Report, sent from the PTC On-Board System 10 to the Back Office Server 108, and forwarded to the Train Location Server 106 by the Message Router 104, can include the head-end track location of the train (TR), an estimated rear-end track location of the train (TR), a current speed of the train (TR), and the earth-centered earth-fixed (ECEF) location of the head-end of the train (TR).

In one implementation, the Locomotive position Report can include the location or position of the train (TR) in the track network, the location or position of at least one locomotive or control car (L) in the track network, the location or position of the at least one railroad car (RC) in the track network, the location or position of a target, e.g., a switch location or a track heading change, such as a curve, in the track network, and the location or position of the target with respect to the location or position of the train (TR) in the track network or the location or position of the at least one locomotive or control car (L) in the track network, or any combination thereof. In some preferred and non-limiting embodiments or aspects, the Locomotive Position Report can include a current speed of the train (TR), a current acceleration of the train, a number of locomotives in the train, a number of cars in the train, a total length of the train (TR), or any combination thereof.

In one implementation, the Locomotive Position Report includes whether the train (TR) is operating at restricted speed, a position uncertainty related to the estimated rear-end location, and processor slice voting results. In addition to other conditions which trigger the sending of a Locomotive Position Report message, the PTC On-Board System 10 sends a Locomotive Position Report when the train commences operation at restricted speed. In another implementation, to potentially reduce the number of messages sent, the PTC On-Board System 10 may trigger sending a Locomotive Position Report when the train (TR) ceases to operate at restricted speed.

In one preferred and non-limiting embodiment or aspect, and with respect to PTC on-board system poll registration, the PTC On-Board System 10 may periodically request office polling with respect to one or more railroad subdivisions from the PTC Back Office Server 108 by transmitting poll request messages to the PTC Back Office Server 108. At least one on-board computer of the PTC On-Board System 10 can request from at least one remote server office polling data. The office polling data can include at least one of the following: synchronization data, mandatory directive data, subdivision data, or any combination thereof. The office polling data can be requested based at least partially on at least one of the following: train location, train location with respect to at least one subdivision, or any combination thereof. A period at which the office polling data is requested can be determined at least partially based upon at least one of the following: the office polling data, the train location data, subdivision data, or any combination thereof.

Office Poll messages sent by the PTC Back Office Server 108 to the PTC On-Board System 10 via the messaging network 102 enable the PTC On-Board System 10 to maintain synchronization of mandatory directives with railroad office systems for the one or more railroad subdivisions. A maximum period at which Office Poll messages are sent by the PTC Back Office Server 108 may be determined by the PTC On-Board System 10 based on the location of the train (TR) with relation to each subdivision and indicated in the poll request messages sent to the PTC Back Office Server 108. The requested period within the poll request message is an indicator of the train's location with respect to the subdivision.

For example, the Train Location Server 106 may compare the requested period, which is forwarded to the Train Location Server 106 by the Message Router 104, to one or more threshold values to determine the train's location with respect to the subdivision, and provide the location to the PTC On-Board System 10 as train location information. The PTC On-Board system 10 can generate at least one poll registration message based at least partially on the office polling data. In one implementation, the Train Location Server 106 receives the poll request or Poll Registration messages via the Message Router 104 without modification, e.g., in the same format that the messages were transmitted from the PTC On-Board System 10.

In another preferred and non-limiting embodiment or aspect, and with respect to communications of the Train Location Server 106, the Train Location Server 106 communicates with the PTC On-Board System 10 using the same communication system in use by the PTC Back Office Server 108. The Message Router 104 duplicates copies of Locomotive Position Report (02080) messages and Poll Registration (02020) messages received from the PTC On-Board System 10 and addressed to the PTC Back Office Server 108, and delivers the copies to the Train Location Server 106. The at least one remote server can authenticate at least a portion of the train location data and at least a portion of the poll registration message. For example, the Train Location Server 106 authenticates each copy of the locomotive messages using the locomotive operational private key (OPK) used by the PTC system.

In another preferred and non-limiting embodiment or aspect, based at least partially on the office polling data and/or the poll registration message, a proximity of the at least one train to at least one subdivision can be determined. For example, and with respect to poll registration, the Train Location Server 106 records each subdivision for which each PTC On-Board System 10 has requested office polling at a rate faster than a threshold value (e.g., "fast polling"). A train's request for polling with respect to a subdivision indicates that the train (TR) has been routed across the subdivision. A request for polling at a rate faster than the threshold value for a subdivision indicates proximity to the subdivision, e.g., that the train (TR) is inside the subdivision or within 50 miles of the subdivision. The PTC On-Board System 10 sends a Poll Registration (02020) message for each subdivision in its train subdivision routing list to the PTC Back Office Server 108, which is forwarded by the Message Router 104 to the Train Location Server 106. In one implementation, the Train Location Server 106 may save the results of some, all, or only the last or most current Poll Registration (02020) message for each subdivision received from a locomotive.

In a preferred and non-limiting embodiment or aspect, based at least partially on at least one of the following: train location data, office polling data, the poll registration message, or any combination thereof, the at least one remote server can transmit to at least one on-board computer of at least one train, which can be the at least one train operating at restricted speed, train location data comprising location or position data related to at least one other train. The train location data can include at least one of the following at least one of the following: train data, head-end data, rear-end data, track data, speed data, target data, direction data, or any combination thereof. For example, and with respect to nearby locomotive position reports, the PTC On-Board System 10 sends a Locomotive Position Report (02080) message for the train. The Train Location Server 106 may save some, all, or only the last or most current Locomotive Position Report (02080) message received from a locomotive (L). In one implementation, the Train Location Server 106 determines which received Locomotive Position Report (02080) messages should be forwarded to other trains (TR). These Locomotive Position Report (02080) messages are "re-packaged" as Nearby Locomotive Position Report (01078) messages by the Train Location Server 106 and sent to trains (TR) that have reported they are operating at restricted speed. The Train Location Server 106 signs each Nearby Locomotive Position Report (01078) message using the locomotive OPK used by the PTC system. The at least one remote server can filter the train location data, such as, by determining at least one "nearby" locomotive of at least one train. For example, because the capacity of the messaging network is not infinite, the Train Location Server 106 may filter the list of Nearby Locomotive Position Report (01078) messages to the reports having higher value. For example, the Train Location Server 106 may transmit a Nearby Locomotive Position Report (01078) message to a train (TR) operating at restricted speed for only those locomotives (L) that are determined to be truly "nearby locomotives". The Train Location Server 106 sends a Nearby Locomotive Position Report (01078) for each "nearby locomotive" to the PTC On-Board System 10 of each train (TR) operating at restricted speed.

In one preferred and non-limiting embodiment or aspect, a method of determining "Nearby Locomotives" for a "Subscribing Locomotive" may include determining "Subscribing Locomotives", determining "Subscribed Subdivisions" for the "Subscribing Locomotives", determining "Candidate Locomotives", and/or determining the "Nearby Locomotives". A Subscribing Locomotive includes a locomotive (L) that reports that it is operating at restricted speed in its latest or current Locomotive Position Report (02080) message. Subscribed Subdivisions for the "Subscribing Locomotive" include a list of subdivisions for which the "Subscribing Locomotive" has requested "fast" office polling. Candidate Locomotives include locomotives (L) that have requested "fast" polling in any of the "Subscribed Subdivisions" of the "Subscribing Locomotive". Nearby Locomotives include "Candidate Locomotives" whose reported head-end ECEF location is within a threshold distance, (e.g. 10 miles), of the head-end ECEF location of the "Subscribing Locomotive".

The identification of the at least one nearby locomotive can include analyzing train data of "Subscribing Locomotive(s)" and the "Candidate Locomotive(s)". The train data can include at least one of the following: head-end data, Earth-centered Earth-fixed data, train location data, train position data, or any combination thereof. For example, the Train Location Server 106 determines Nearby Locomotives for each train (TR) operating at restricted speed, i.e., for each Subscribing Locomotive, based on the above-described method.

The at least one remote server transmits to the at least one "Subscribing Locomotive", the identification of the at least one "Nearby Locomotive". For example, the Train Location server 106 sends a Nearby Locomotive Position Report (01078) for each Nearby Locomotive to the PTC On-Board System 10 of each train (TR) operating at restricted speed. Locomotives (L) that have not requested "fast" polling in any of the Subscribed Subdivisions of the Subscribing Locomotive and/or whose reported head-end ECEF location is within a threshold distance may not be included as a Nearby Locomotive for the Subscribing Locomotive, and Train Location Server 106 need not send a Nearby Locomotive Position Report (01078) for these locomotives (L) to the PTC On-Board System 10 of the Subscribing Locomotive.

In another preferred and non-limiting embodiment or aspect, the Train Location Server 106 sends a Nearby Locomotive Position Report (01078) for each Nearby Locomotive when a new Subscribing Locomotive is discovered because the time interval before subsequent Locomotive Position Report (02080) messages are received is non-deterministic and may be up to about 5 minutes. If the Train Location Server 106 receives a Locomotive Position Report (02080) message from a locomotive (L), the Train Location Server 106 checks if the locomotive (L) is a Candidate Locomotive for any Subscribing Locomotive. If the distance check is below a threshold distance, the Train Location Server 106 sends a corresponding Nearby Locomotive Position Report (01078) message to that subscribing locomotive.

In one preferred and non-limiting embodiment or aspect, the PTC On-Board System 10 periodically requests office polling from the PTC Back Office Server 108 on a subdivision basis. The period of requests can be correlated to the requested poll period, and the maximum period may be about one hour. If the Train Location Server 106 does not receive a request for polling for a subdivision for more than the maximum period, e.g., about one hour, from a locomotive (L), the Train Location Server 106 deletes the poll request information for that locomotive (L) and subdivision. Accordingly, if a locomotive (L) abruptly stops communicating with the PTC Back Office Server 108, its last-reported location may be distributed to trains (TR) operating at restricted speed by the train location server 106 until the maximum period expires, e.g., for a maximum of one hour.

In another preferred and non-limiting embodiment or aspect, and with respect to PTC on-board system target generation, the PTC On-Board System 10 may receive one or more Nearby Locomotive Position Report (01078) messages from the Train Location Server 106 while the PTC On-Board System 10 is operating at restricted speed. Each message indicates the head-end and rear-end track locations of the other trains (TR) that may be nearby. If the train (TR) is no longer operating at restricted speed, the PTC On-Board System 10 may discard each received Nearby Locomotive Position Report (01078) message and any targets that may have been generated as a result of the received Nearby Locomotive Position Report (01078) messages. In another implementation, the PTC On-Board System 10 generates zero-speed targets for each of the head and rear end track locations of each reported nearby train (TR) if the head and rear end track locations are on the calculated route of the PTC On-Board system 10. The location of the zero-speed targets is based on the reported direction of movement of the nearby train. If the direction of movement of the nearby train is in the same direction as the PTC On-Board System 10, the zero-speed targets are placed at the head-end and rear-end track locations as reported in the Nearby Locomotive Position Report (01078) message associated with the nearby train (TR). If the direction of movement of the nearby train (TR) is in the opposite direction as the PTC On-Board system 10, the zero-speed targets are placed in advance of the nearby train's reported head-end and rear-end locations. The amount of advancement in the placement of the targets can be based on the nearby train's reported speed multiplied by the elapsed time since the time of the report.

In some embodiments, the at least one on-board computer of the at least one train, e.g., the PTC On-Board System 10, can store, process, or delete at least a portion of the train location data. For example, when a Nearby Locomotive Position Report (01078) message is received at the PTC On-Board System 10, the PTC On-Board System 10 deletes any targets generated as a result of a previous Nearby Locomotive Position Report (01078) message identifying the same locomotive (L). The PTC On-Board System 10 need not set targets for head-end and rear-end track locations if the Nearby Locomotive Position Report (01078) message identifies the PTC On-Board System 10 itself, e.g., does not identify another locomotive (L) in the track system. In one preferred and non-limiting embodiment or aspect, each PTC On-Board System 10 sends a Locomotive Position Report (02080) message to the PTC Back Office Server 108 controlling the subdivision where the head-end is located, (e.g., preferably at a minimum of every 5 minutes).

In one preferred and non-limiting embodiment or aspect, if the PTC On-Board System 10 qualifies as "nearby" a train (TR) operating at restricted speed for one or more other PTC On-Board systems 10, the Train Location Server 106 generates a Nearby Locomotive Position Report (01078) to the one or more other PTC On-Board systems 10, for example, every 5 minutes. The PTC On-Board System 10 deletes a Nearby Locomotive Position Report (01078) message and any targets that may have been generated as a result of the message if the age of the report satisfies a threshold, e.g., if the report is over 10 minutes old, which allows for propagation delays and message loss while minimizing management of stale data.

In a further preferred and non-limiting embodiment or aspect, and with respect to PTC on-board system target warning and enforcement, the PTC On-Board System 10 warns and enforces for a "nearby train" target in a fashion similar to unknown switches. For example, if the locomotive (L) stops within a threshold distance of the target, the PTC On-Board System 10 deletes the target. If the train (TR) changes directions, as long as the nearby train positions still apply and the calculated route still includes the nearby trains (TR), the target is regenerated by the PTC On-Board system 10. In one implementation, when warning for a nearby train target, the PTC On-Board System 10 displays the locomotive ID of the nearby train (TR) so that the crew may contact the crew of the nearby train (TR) over voice radio. In another preferred and non-limiting embodiment or aspect, the crew may access a text-based page on the Cab Display Unit (CDU) screen while operating at restricted speed that identifies the status of all nearby trains (TR), including locomotive ID and time of last location report. The CDU may thus help to provide confidence in the system in the event of warnings associated with "phantom" nearby trains (TR). No icons or special indicators on the CDU track map are needed for this embodiment or aspect.

Figure 3:
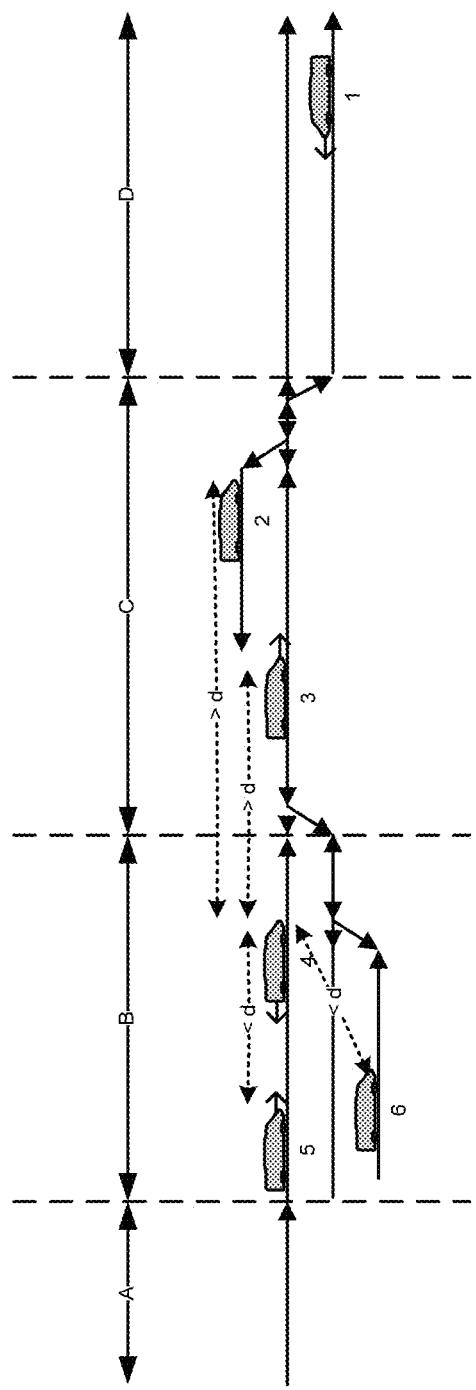
FIG. 3 is a schematic view of an example train distribution over subdivisions illustrating a method and protection system for trains operating at restricted speeds according to principles of the present invention.

In one exemplary embodiment or aspect, and as illustrated in FIG. 3, six trains (1, 2, 3, 4, 5, and 6) are distributed over four subdivisions (A, B, C, and D). FIG. 5 includes a table that shows in which subdivisions each train (TR) has requested "fast" polling. It should be noted that "fast" polling may be an indication of proximity to a subdivision rather than occupancy. In one preferred and non-limiting embodiment or aspect the distance threshold for "fast" polling is 50 miles from a subdivision.

In this example, locomotive 4 reports that it is operating at restricted speed. Locomotive 4 is thus a "subscribing locomotive". The "subscribed subdivisions" for locomotive 4 are A, B, and C. The "subscribed subdivisions" for locomotive 4 are indicated in the Poll Registration (02020) messages sent by the PTC On-Board System 10 of the locomotive 4 to the PTC Back Office Server 108 (and forwarded to the Train Location Server 106 by the Message Router 104). The "candidate locomotives" with respect to locomotive 4 are all locomotives that have requested "fast" polling in the "subscribed subdivisions" of locomotive 4, namely locomotives 2, 3, 4, 5, and 6, i.e., (the union of (2, 3, 4)∪(3, 4, 5, 6)∪(4, 5)). The distance between head-end ECEF location of each "candidate locomotive" and head-end ECEF location of the subscribing locomotive, in this example locomotive 4, is compared to threshold (d) by the Train Location Server 106. Since locomotives 2 and 3 are too far away, i.e., the distance between the head-end ECEF of locomotive 2 and the head-end ECEF location of locomotive 4 and the distance between the head-end ECEF of locomotive 3 and the head-end ECEF location of locomotive 4 violate the threshold (d), only locomotives 5 and 6 are determined to be "nearby locomotives" for locomotive 4 by the Train Location Server 106. The PTC On-Board System 10 of locomotive 4 receives Nearby Locomotive Position Report (01078) messages from the Train Location Server 106 for both locomotives 5 and 6. The PTC On-Board System 10 of locomotive 4 determines the head-end track location of locomotive 5 on its calculated route and creates a target for the determined location. Because the direction of movement of locomotive 5 is in the opposite direction as locomotive 4, the PTC On-Board System 10 defines the target location in advance of the last-reported locomotive 5 location, as described above. The Train Location Server 106 can similarly determine candidate locomotives for the other locomotives 1-3, 5, and 5, and determines and transmits Nearby Locomotive Position Report (01078) messages, if applicable, to the other locomotives 1-3, 5, and 6 for any nearby locomotives.

Figure 4:
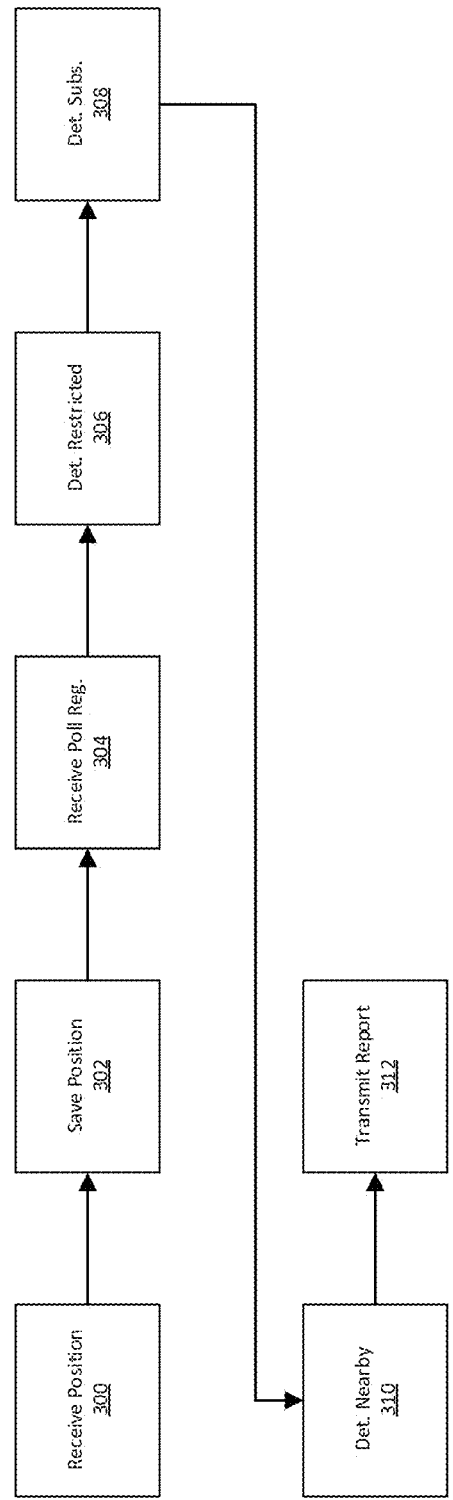
FIG. 4 is a flow chart illustrating a method for providing improved protection for trains operating at restricted speeds according to the principles of the present invention.

FIG. 4 is a flow chart of an embodiment of a method for providing improved protection for trains operating at restricted speeds according to a preferred and non-limiting embodiment or aspect. At stage 300, the Train Location Server 106 receives Locomotive Position Report (02080) messages sent from PTC On-Board Systems 10 of trains in the railway system and network to PTC Back Office Server 108 and forwarded by Message Router 104. The PTC On-Board System 10 of each train may send the Locomotive Position Report (02080) messages at regular intervals and/or when triggered by various conditions as described herein. The Train Location Server 106 can save only the last or most current Locomotive Position Report (02080) message received from respective locomotives at stage 302. At stage 304, the Train Location Server 106 receives Poll Registration (02020) messages sent by the PTC On-Board Systems 10 of trains in the railway system and network to PTC Back Office Server 108 and forwarded by Message Router 104. At stage 306, the Train Location Server 106 determines, for each Locomotive Position Report (02080) message, whether the train identified by the message is operating at a restricted speed. At stage 308, the Train Location Server determines one or more restricted subdivisions for the train based on the Poll Registration (02020) message sent by the PTC On-Board system 10 of the train.

At stage 310, the Train Location Server 106 determines for each train that has been determined to be operating at a restricted speed a list of nearby trains for the train. In one implementation, the Train Location Server 106 determines which received Locomotive Position Report (02080) messages should be forwarded to other trains. These Locomotive Position Report (02080) messages are "re-packaged" as Nearby Locomotive Position Report (01078) messages by the Train Location Server 106 and sent to trains that have reported they are operating at restricted speed. The Train Location Server 106 signs each Nearby Locomotive Position Report (01078) message using the locomotive OPK used by the PTC system. Because the capacity of the messaging network is not infinite, the Train Location Server 106 may use a method to filter the list of Nearby Locomotive Position Report (01078) messages to those of higher value, for example, the Train Location Server 106 may transmit a Nearby Locomotive Position Report (01078) message to a train operating at restricted speed for only those locomotives that are determined to be truly "nearby locomotives", as described herein. For example, the distance between head-end ECEF location of each "candidate locomotive" and head-end ECEF location of the subscribing locomotive can be compared to threshold by the Train Location Server 106 to determine if the locomotive is truly a "nearby locomotive" for which a Nearby Locomotive Position Report (01078) message should be sent to the train operating at restricted speed. At stage 312, the Train Location Server 106 transmits a Nearby Locomotive Position Report (01078) for each "nearby locomotive" to the PTC On-Board System 10 of each train operating at restricted speed.

In this manner, preferred and non-limiting embodiments or aspects provide an improved method and protection system for a trains operating at restricted speed.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for a plurality of trains, at least one of which is operating at a restricted speed, the method comprising:
  (a) transmitting, by on-board computers of each of a plurality of trains, train location data;
  (b) receiving, with at least one remote server, the train location data;
  (c) requesting from the at least one remote server, by at least one on-board computer of a train, office polling data based at least partially on at least one subdivision in a route for the train;
  (d) generating, by the at least one on-board computer, at least one poll registration message based at least partially on the office polling data;
  (e) transmitting the at least one poll registration message from the at least one on-board computer to the at least one remote server;
  (f) based at least partially on the at least one poll registration message, determining proximity of the train to at least one subdivision;
  (g) transmitting, by the at least one remote server to the at least one on-board computer of the train, nearby locomotive position data associated with location or position data related to at least one other train, the nearby locomotive position data generated based at least partially on the proximity of the train to the at least one subdivision and the train location data related to at least one other train of the plurality of trains; and (h) controlling, by the at least one on-board computer, a speed of the train based at least partially on the nearby locomotive position data.

2. The computer-implemented method of claim 1, wherein the transmitting step (a) is implemented on at least one of the following bases: at least one interval, at least one regular interval, at least one condition, at least one trigger, at least one trigger event, a change in direction of travel, a location in relation to at least one feature, at least one state, initiation of restricted speed, and cessation of restricted speed.

3. The computer-implemented method of claim 1, wherein the train location data comprises at least one of the following: head-end track location, rear-end track location, head-end data, rear-end data, speed, Earth-centered Earth-fixed location data, Earth-centered Earth-fixed location of a head-end of the train, track data, target data, direction data, position uncertainty, and processor slice voting results.

4. The computer-implemented method of claim 1, wherein the office polling data comprises at least one of the following: synchronization data, mandatory directive data, and subdivision data.

5. The computer-implemented method of claim 1, wherein the requesting step (c) is based at least partially on at least one of the following: train location and train location with respect to the at least one subdivision.

6. The computer-implemented method of claim 1, further comprising authenticating, by the at least one remote server, at least a portion of the train location data and at least a portion of the at least one poll registration message.

7. The computer-implemented method of claim 1, further comprising storing, by the at least one remote server, at least a portion of the train location data based at least partially upon timing or status.

8. The computer-implemented method of claim 1, further comprising generating the nearby locomotive position data by:

(i) based at least partially on the train location data, identifying at least one locomotive of at least one train as at least one subscribing locomotive that is associated with operating at a restricted speed;

(ii) based at least partially on the train location data and/or office polling data, identifying at least one subscribed subdivision for which the at least one subscribing locomotive is associated with fast office polling;

(iii) based at least partially on at least one of steps (i) and (ii), identifying at least one locomotive as at least one candidate locomotive that is associated with fast office polling in the at least one subscribed subdivision of the at least one subscribing locomotive; and (iv) based at least partially on at least one of steps (i)-(iii), identifying at least one locomotive as at least one nearby locomotive that is associated with fast office polling in the at least one subscribed subdivision of the at least one subscribing locomotive and a location or position within a threshold distance of the at least one subscribing locomotive.

9. The computer-implemented method of claim 8, wherein identifying step (iv) comprises analyzing train data of the at least one subscribing locomotive and the at least one candidate locomotive.

10. The computer-implemented method of claim 9, wherein the train data comprises at least one of the following: head-end data, Earth-centered Earth-fixed data, train location data, and train position data.

11. The computer-implemented method of claim 8, further comprising transmitting, by the at least one remote server to the at least one subscribing locomotive, the identification of the at least one nearby locomotive.

12. The computer-implemented method of claim 1, wherein the requesting step (c) is repeated periodically.

13. The computer-implemented method of claim 12, wherein the period is determined at least partially based upon at least one of the following: the office polling data, the train location data, and subdivision data.

14. The computer-implemented method of claim 1, wherein the nearby locomotive position data of transmitting step (g) comprises at least one of the following: train data, head-end data, rear-end data, track data, speed data, target data, and direction data.

15. The computer-implemented method of claim 1, further comprising storing, processing, or deleting, by the at least one on-board computer of the at least one train, at least a portion of the train location data.

16. A protection system for a plurality of trains, at least one of which is operating at a restricted speed, wherein the system comprises the on-board computers of each of the plurality of trains of claim 1 programmed or configured to implement the step (a) of claim 1, the at least one onboard computer of the train of claim 1 programmed or configured to implement the steps (b), (c), (d), (e) and (h) of claim 1, and the at least one remote server of claim 1 programmed or configured to implement the steps (f) and (g) of claim 1.

17. A protection system for a train having at least one locomotive or control car and, optionally, at least one railroad car, operating in a track network, the system comprising:

on the at least one locomotive or control car:
an on-board computer programmed or configured to implement or facilitate at least one train action; and
a communication device in communication with the on-board computer and programmed or configured to receive, transmit, and/or process data signals,
wherein the on-board computer of the at least one locomotive or control car is programmed or configured to:
transmit, via the communication device, train location data to at least one remote server;
request, from the at least one remote server, office polling data based at least partially on at least one subdivision in a route for the train;
receive, via the communication device, the requested office polling data;
generate at least one poll registration message based at least partially on the office polling data;
transmit the at least one poll registration message to the at least one remote server; and
control a speed of the train; and
wherein the at least one remote server is programmed or configured to:
receive train location data related to at least one other train;
generate nearby locomotive position data based at least partially on the at least one poll registration message and the train location data related to the at least one other train; and
transmit the nearby locomotive position data to the at least one on-board computer of the train, wherein the on-board computer of the at least one locomotive or control car controls the speed of the train based at least partially on the nearby locomotive position data.

18. A protection system for a plurality of trains, each train having at least one locomotive or control car and, optionally, at least one railroad car, operating in a track network, the system comprising:
at least one remote server, wherein the at least one remote server is programmed or configured to:
receive train location data from the plurality of trains;
receive poll registration messages from the plurality of trains;
determine proximity of a train to at least one subdivision;
generate nearby locomotive position data based at least partially on proximity of the train to the at least one subdivision and at least one of the following: a poll registration message of at least one other train of the plurality of trains and the train location data related to the at least one other train of the plurality of train; and
transmit the nearby locomotive position data to the train, wherein an on-board computer of at least one locomotive or control car of the train controls a speed of the train in response to the nearby locomotive position data.

* * * * *